(12) United States Patent
Maier

(10) Patent No.: US 7,677,372 B2
(45) Date of Patent: Mar. 16, 2010

(54) CONDUCTOR CLAMP FOR A TRAILING LINE

(75) Inventor: Bernd Maier, Schliengen (DE)

(73) Assignee: Conductix-Wampfler AG, Weil am Rhein-Markt (DE)

( * ) Notice: Subject to any disclaimer, the term of this patent is extended or adjusted under 35 U.S.C. 154(b) by 0 days.

(21) Appl. No.: 12/278,749

(22) PCT Filed: Dec. 16, 2006

(86) PCT No.: PCT/EP2006/012154

§ 371 (c)(1),
(2), (4) Date: Oct. 15, 2008

(87) PCT Pub. No.: WO2007/090454

PCT Pub. Date: Aug. 16, 2007

(65) Prior Publication Data

US 2009/0026032 A1    Jan. 29, 2009

(30) Foreign Application Priority Data

Feb. 8, 2006    (DE) ........................ 10 2006 005 720

(51) Int. Cl.
*B65H 75/44*    (2006.01)
(52) U.S. Cl. .................................. 191/12.2 R; 191/12 R
(58) Field of Classification Search ............ 191/12.2 R; 248/49, 58, 60, 61, 63, 65, 73, 228.6, 231.71, 248/610, 636
See application file for complete search history.

(56) References Cited

U.S. PATENT DOCUMENTS 3,819,846 A * 6/1974 Jakobsen .................. 174/11 R (Continued)

FOREIGN PATENT DOCUMENTS

DE    11 93 333    5/1965

(Continued)

OTHER PUBLICATIONS

International Search report for PCT/EP06/012154.

(Continued)

*Primary Examiner*—S. Joseph Morano
*Assistant Examiner*—Jason C Smith
(74) *Attorney, Agent, or Firm*—Martin Fleit; Paul D. Bianco; Fleit Gibbons Gutman Bongini & Bianco, P.L.

(57) ABSTRACT

A conductor clamp (4) for a trailing line (5) which is secured to crabs (7) which can be moved along a carrier rail (1) comprises a support (8) for the trailing line, a clamping device (9) for securing the trailing line to the support and a shock absorber (10) for absorbing an impact of the first crab on the conductor clamp. The shock absorber has at least two spring bodies (20, 22) which have different characteristics and which are arranged one behind the other in the anticipated direction of action of the shock absorber. In this context, the most resilient spring body (20) is arranged closest to the end of the shock absorber which is provided for the application of an impact force. The shock absorber also has a lifting rod (16) which can be displaced under the effective impact force in the anticipated direction of action of the shock absorber. At the two ends of the lifting rod, spring bodies with different characteristics are arranged. The shock absorber has a housing in which the lifting rod is movably mounted, with an internal end of the lifting rod being located inside the housing, and an external end of said lifting rod being located outside the housing.

7 Claims, 4 Drawing Sheets

U.S. PATENT DOCUMENTS

| | | | |
|---|---|---|---|
| 4,372,510 A * | 2/1983 | Skypala | 248/58 |
| 6,272,999 B1 * | 8/2001 | Pugin et al. | 104/125 |
| 6,752,406 B2 * | 6/2004 | Pierce et al. | 280/86.5 |
| 2001/0022334 A1 * | 9/2001 | Iwata et al. | 248/118 |
| 2002/0149164 A1 * | 10/2002 | Pierce et al. | 280/86.5 |
| 2007/0278376 A1 * | 12/2007 | Townsend | 248/610 |
| 2009/0026032 A1 * | 1/2009 | Maier | 191/12.2 R |
| 2009/0057498 A1 * | 3/2009 | Oh et al. | 248/68.1 |
| 2009/0065675 A1 * | 3/2009 | Hardtke | 248/617 |
| 2009/0140105 A1 * | 6/2009 | Baverel et al. | 248/49 |

FOREIGN PATENT DOCUMENTS

| | | |
|---|---|---|
| DE | 32 36 992 | 4/1984 |
| DE | 102006005720 B3 * | 5/2007 |
| EP | 1 008 798 | 6/2000 |
| EP | 1008798 A1 * | 6/2000 |
| WO | WO 2007/090454 | 8/2007 |
| WO | WO 2007087854 A1 * | 8/2007 |
| WO | WO 2007090454 A1 * | 8/2007 |

OTHER PUBLICATIONS

International Preliminary Report on Patentability for PCT/EP06/012154.
Written Opinion of the International Search Authority for PCT/EP06/012154.
English translation of the International Preliminary Report on Patentability published Oct. 22, 2008 for PCT/EP2006/012154 filed Dec. 16, 2006.

* cited by examiner

CONDUCTOR CLAMP FOR A TRAILING LINE

FIELD OF THE INVENTION

The invention relates to a conductor clamp for a trailing line. Such a conductor clamp is used for securing one end of a trailing line to one end of a carrier rail, along which the trailing line can be towed by means of several crabs. For this purpose, the conductor clamp is mounted stationary on the carrier rail.

BACKGROUND OF THE INVENTION

From DE 32 36 992 A1 it is known to arrange damping elements in the form of chain pieces, which are vulcanized in place to form a rubber package, for damping abrupt mechanical loads in the traction cables, through which the individual crabs are coupled with each other, when the crabs are moved away from each other. In the course of the movement of the trailing line, the individual crabs can also impact each other. Due to the moving support of the crabs on the carrier rail, damping elements of a simple type are adequate for damping the impacts caused by such collisions. In DE 32 36 992 A1 mentioned above, rubber bumpers are provided on the end faces of the crabs. However, the conductor clamp, which secures one end of the trailing line to one end of the carrier rail, is mounted stationary on the carrier rail and cannot yield by means of its own movement, when the first crab impacts against it with the return movement of the trailing line. Therefore, more resilient damping for the impacts caused by contact of the first crab must be provided on the conductor clamp.

SUMMARY OF THE INVENTION

The present invention is based on the task of providing a solution for damping the impact of the first crab of a trailing line on its conductor clamp, wherein this solution is distinguished by effectiveness according to the requirements with a simple construction.

This task is achieved according to the invention by a conductor clamp with the features of Claim 1. Advantageous improvements are specified in the subordinate claims.

According to the invention, the conductor clamp is equipped with a shock absorber, which has at least two spring bodies, which have different characteristics and which are arranged one behind the other in the anticipated direction of action of the shock absorber, wherein at least one of the spring bodies (20) is made from an elastic material with a cellular structure, and in that the overall characteristics of the shock absorber are non-linear and have an initial region with a small increase in the spring force over the deflection and a following region with a greater increase in the spring force over the deflection. In this way, the total characteristics of the shock absorber can be achieved, which are optimally adapted to the requirements of the impact damping at the end of a trailing line. The intensity of an impact of the first crab on the conductor clamp can vary, namely within wide limits, so that for a high impact intensity, sufficiently hard damping characteristics are required that would barely have a damping effect for a low impact intensity. Here, especially suitable for a spring body of large resilience, like that needed for a low impact intensity, is an elastic material with a cellular structure. By means of the invention, the different requirements on the damping characteristics across the entire incident range of the impact intensity can be satisfied.

It is especially useful to arrange a resilient spring body at the end of the shock absorber, wherein this spring body is provided for introducing an impact force, so that this spring body can take over the damping essentially by itself for an impact of low intensity, without other components of the shock absorber being significantly deflected.

One advantageous solution for coupling spring bodies of different characteristics is their arrangement at different ends of a lifting rod, which can be displaced under the effective impact force in the anticipated direction of action of the shock absorber. Here, stiff spring bodies support the lifting rod on a housing, which functions as a bearing for the lifting rod and as a carrier for the stiff spring bodies. It is especially advantageous when the housing simultaneously forms a part of the holder for mounting the conductor clamp on the carrier rail.

The arrangement of at least two similar spring bodies one next to the other in the housing, to which the total effective force is distributed at least approximately uniformly, permits an especially compact construction of the shock absorber and a stable guidance of its moving components in the case of a deflection.

BRIEF DESCRIPTION OF THE DRAWINGS

Below, an embodiment of the invention will be explained with reference to the enclosed drawings. Shown in these are
FIG. 1, a schematic diagram of a trailing line system,
FIG. 2, a conductor clamp according to the invention in three views,
FIG. 3, enlarged partial views of the shock absorber of the conductor clamp from FIG. 2,
FIG. 4, the characteristic curve of one of the spring bodies of the shock absorber from FIG. 3, and
FIG. 5, the characteristic curve of the entire shock absorber from FIG. 3.

DETAILED DESCRIPTION OF THE INVENTION

Figure 1:
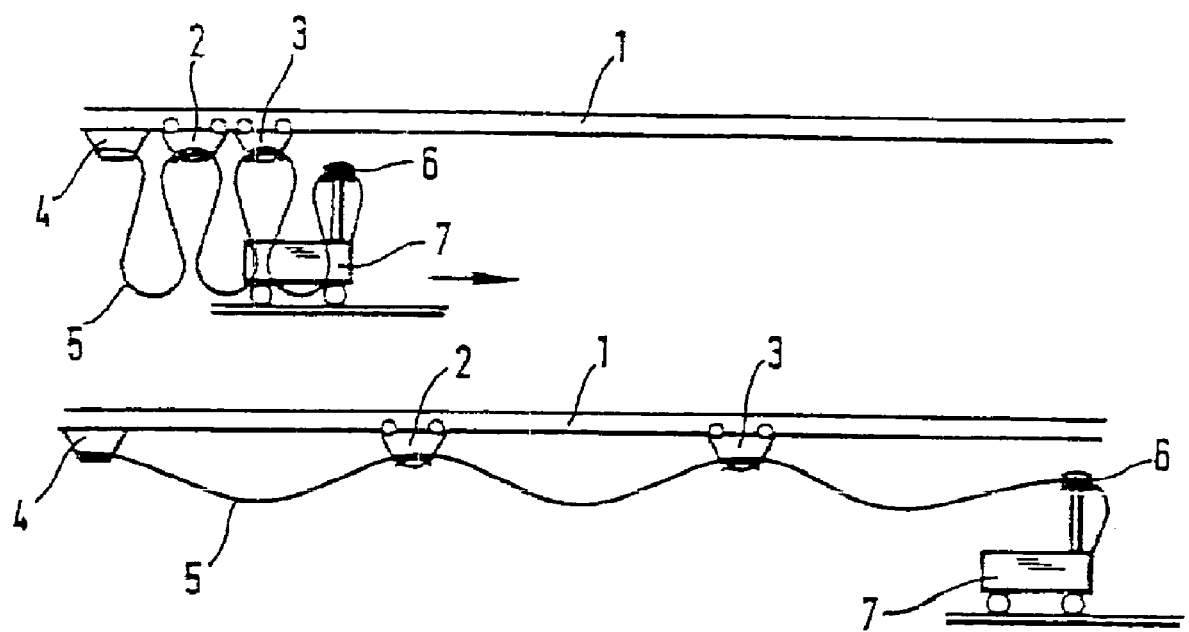

As shown schematically in FIG. 1, in a trailing line system, several moving crabs 2 and 3 are guided on a carrier rail 1, wherein their number is generally significantly larger than two. Starting from a conductor clamp 4 mounted rigidly on one end of the carrier rail 1, one or more lines 5, for example, electrical lines, are guided via the crabs 2 and 3 to a line clamp 6 of a moving work device 7, for example, a derrick car. Because the crabs 2 and 3 can collide with each other in the course of their movements following the work device 7 along the carrier rail 1, they are equipped with shock absorbers that are not shown in FIG. 1. These shock absorbers do not need to have a very resilient construction, because the crabs 2 and 3 can also yield due to their own movement when there is an impact. However, this does not apply for the conductor clamp 4, which would be subjected to relatively large vibrations when the trailing line is moved back into the starting position shown at the top in FIG. 1 due to the impact of the first crab 2 together with this clamp, and therefore a more resilient shock absorber is needed than the moving crabs 2 and 3.

Figure 2:
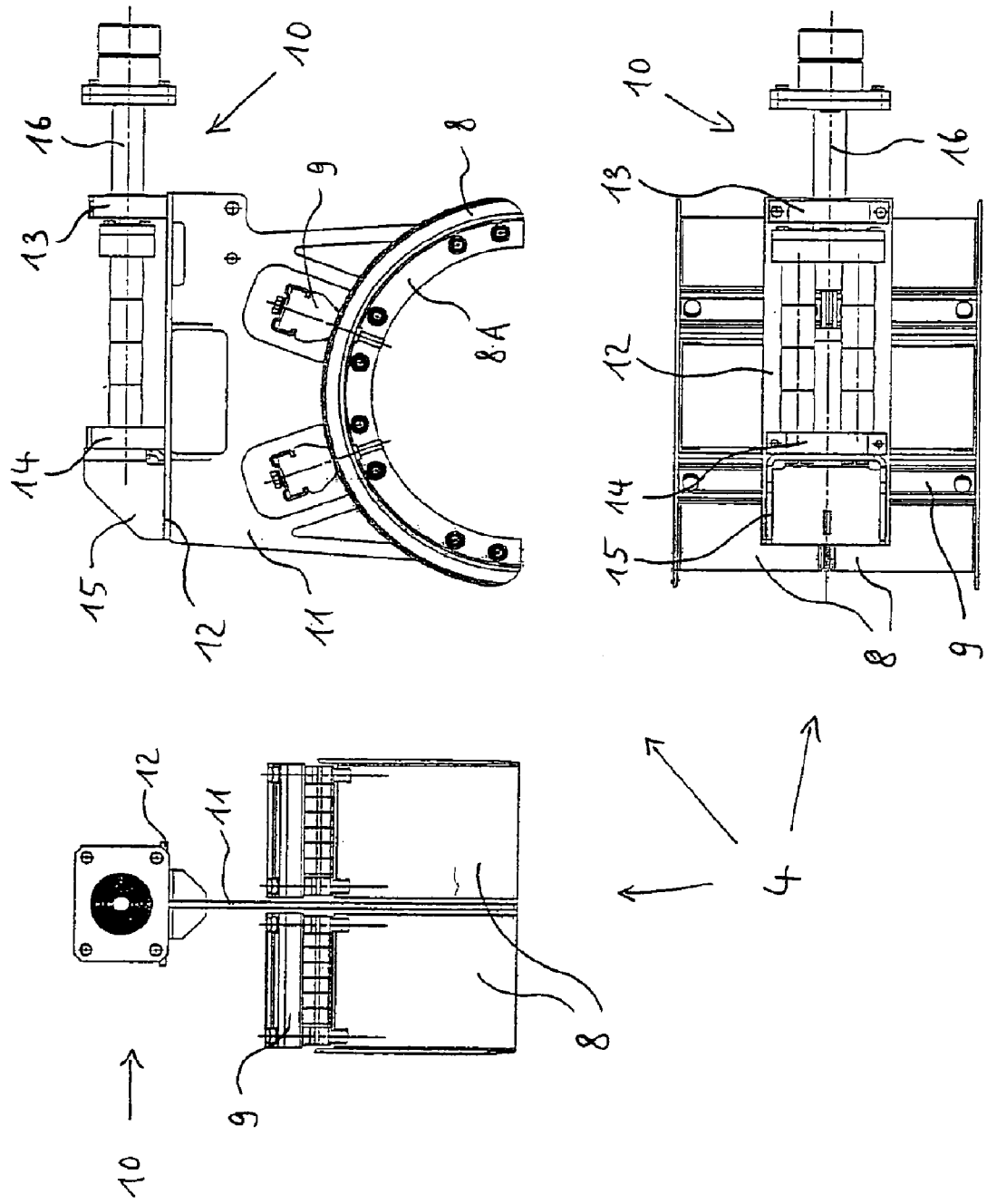

FIG. 2 shows a conductor clamp 4 according to the invention in three views, wherein at the top right, the side view corresponding to FIG. 1 is to be seen, so that the trailing line not shown in FIG. 2 would extend outward to the right from the conductor clamp 4. Next to this on the left, the front view is to be seen and at the bottom right, the top view is to be seen. As can be seen best in the side view, the conductor clamp 4 includes a support 8 that is essentially semicircular in this view for the trailing line, clamping devices 9 for securing the trailing line to the support 8, and a shock absorber 10, which is connected to the support 8 by a carrier plate 11. The support 8 is made from two symmetric parts, which each have a flange 8A, at which they are screwed both to each other and also to the carrier plate 11.

At its upper end, a plate 12, which is a component of a housing of the shock absorber 10, i.e., forms its base plate 12, is attached, e.g., fused, to the carrier plate 11 perpendicular to this carrier plate. Other essential components of the housing of the shock absorber 10 are a front wall 13 and a rear wall 14. The rear wall is supported by a support angle 15, which is connected, e.g., hooked, to the base plate 12 with a positive fit. Furthermore, the housing also comprises a cover, which is not shown in FIG. 2 and which closes the other three sides. The housing also forms a part of a holder, with which the conductor clamp 4 can be attached to the carrier rail 1, in that it is designed to be connected to a component, which can be connected on its side directly to the carrier rail 1. Such a component can be shaped, in particular, so that it partially encompasses the housing, contacts the bottom side of the base plate 12, and can be connected to this base plate by boreholes that are aligned with each other.

Figure 3:
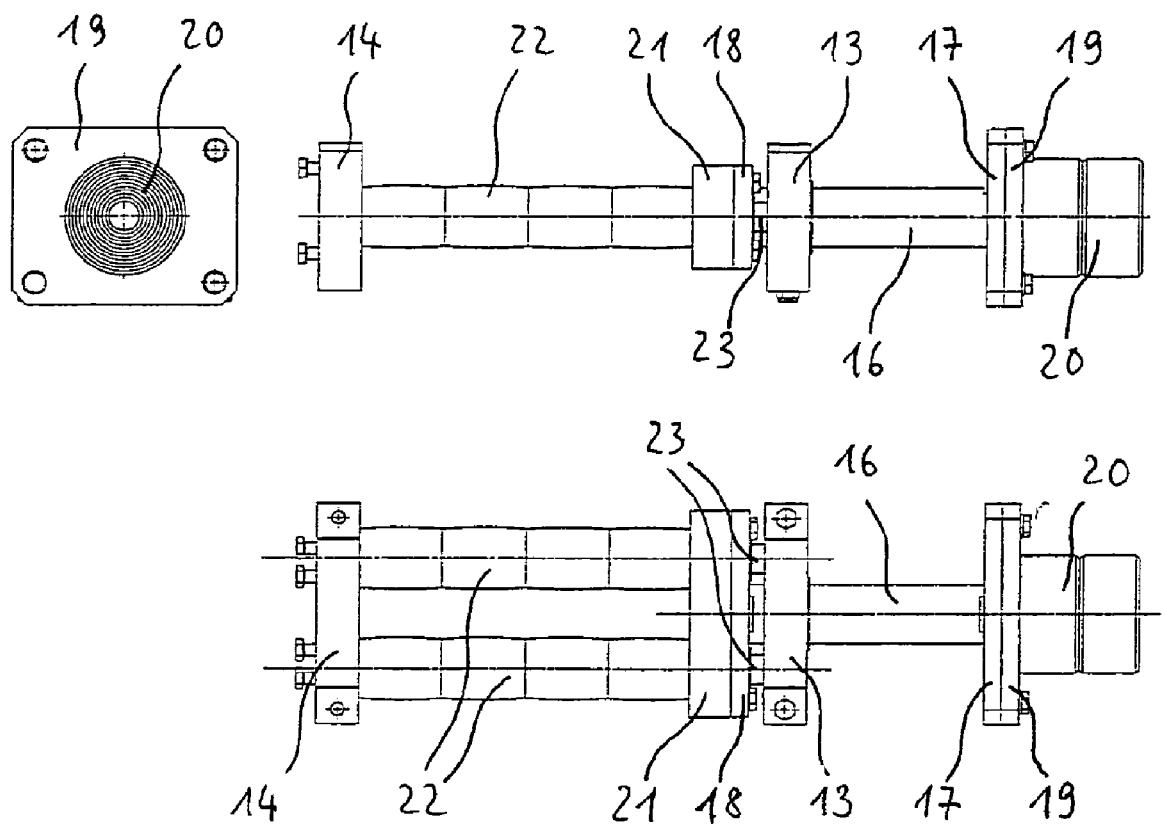

The components of the shock absorber 10 are shown enlarged in FIG. 3 without the base plate 12 and the cover that is also not visible in FIG. 2. These components include a moving lifting rod 16, which, in its rest position, is located predominantly outside the housing, but projects into this housing through the front wall 13. On its outer end with respect to the housing, an outer end plate 17 is attached to the lifting rod 16 and on its inner end in this respect, an inner end plate 18 is attached.

Figure 4:
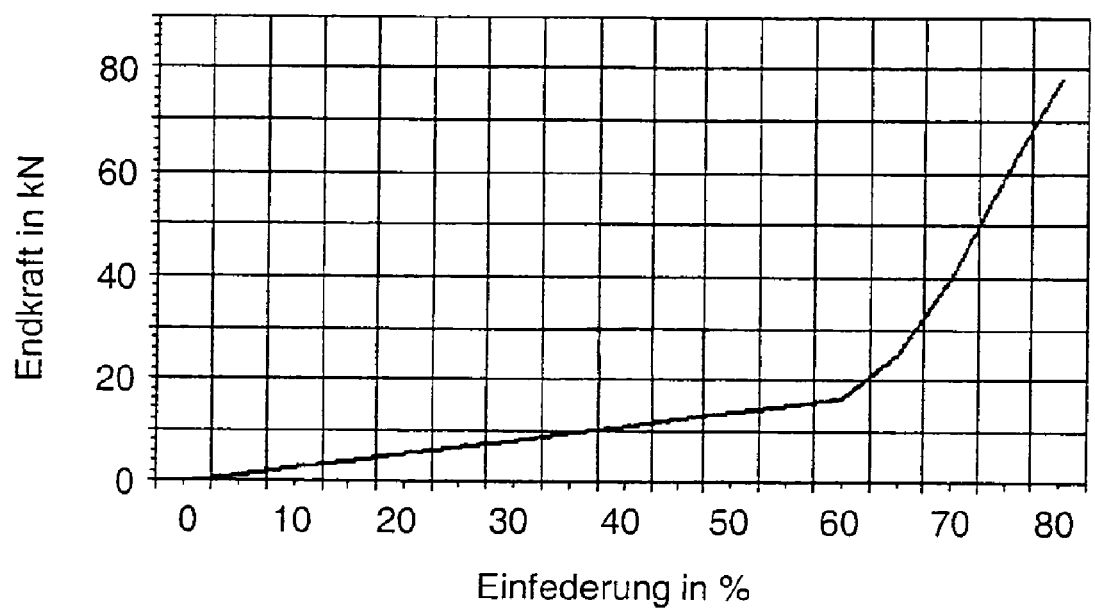

A resilient spring body 20, which is made from a plastic, such as polyurethane, with a cellular structure, is attached to the outer end plate 17 by means of a connection plate 19. Such spring bodies 20 also known as cell bumpers are distinguished by high compressibility for only small lateral expansion and as such are also known. A typical characteristic curve of such a spring body 20 in the form of a cell bumper is shown in FIG. 4 as an example. It is characterized in that the force via the relative compression initially rises with only a small slope and this slope changes nearly abruptly to a significantly larger value only at a considerable compression of, in this case, approximately two thirds of the length.

The inner end plate 18 is attached to a pressure plate 21, which clamps two rows of similar, relatively stiff spring bodies 22 one next to the other between themselves and the rear wall 14 of the housing. These stiff spring bodies 22 are each made from a rubber-elastic solid material with an essentially linear spring characteristic curve and have the shape of a hollow cylinder, which is not visible in the figures. In each of the two rows, several such spring bodies 22 are placed one behind the other on a guide rod 23 running between the front wall 13 and the rear wall 14, wherein together, they enclose the guide rod 23 along the entire distance between the pressure plate 21 and the rear wall 14. In this way, the stiff spring bodies 22 support the lifting rod 16 in the axial direction against the rear wall 14 of the housing of the shock absorber 10. For redirecting a force exerted by the spring bodies 22 on the rear wall 14 due to this support into the base plate 12, the support angle 15 is provided.

The guide rods 23 are attached to the front wall 13 and to the rear wall 14 of the housing and project through the pressure plate 21 and the inner end plate 18. In interaction with the opening, at which the lifting rod 16 projects through the front wall 13 of the housing, they form a guide for a movement of the lifting rod 16 and the components connected rigidly to it, namely the plates 17, 18, 19, and 21, as well as the spring body 20, which, in the case of a sufficiently large application of force of the lifting rod 16 in its axial direction, which represents the direction of action of the shock absorber 10, is introduced against the supporting force of the spring body 22. Such a movement of the lifting rod 16 is thus guided at three different positions, which guarantees high stability and security against tipping.

The crabs 2 and 3 of the trailing line, which are not described in more detail here, are each equipped with shock absorbers of simple type, for example, in the form of rubber bumpers. In the ready-for-use, assembled state of the trailing line, the longitudinal center axis of the lifting rod 16 aligns with that of the shock absorber of the crabs 2 and 3, so that, when the first crab 2 impacts the conductor clamp 4 when the trailing line is moved back, the shock absorber of the first crab 2 facing the conductor clamp 4 impacts against the spring body 20 in the axial direction of the lifting rod 16.

If the impact has only a small intensity, then due to the relatively large support force of the spring body 22 and also the inertia of the lifting rod 16 and the plates 17, 18, 19, and 21 connected rigidly to it, essentially only the resilient spring body 20 absorbs the impact energy and thus damps the vibrations of the first crab 2 and the conductor clamp 4. However, if the impact has an intensity that exceeds the energy absorption capacity of the resilient spring body 20, then after a maximum compression of this resilient spring body, a significant deflection of the lifting rod 16 is introduced against the support force of the stiff spring body 22, wherein this deflection is guided as described before. The deflection ends at a certain point and the lifting rod 16 is forced back by the spring bodies 22 into the starting position shown in FIGS. 2 and 3.

Figure 5:
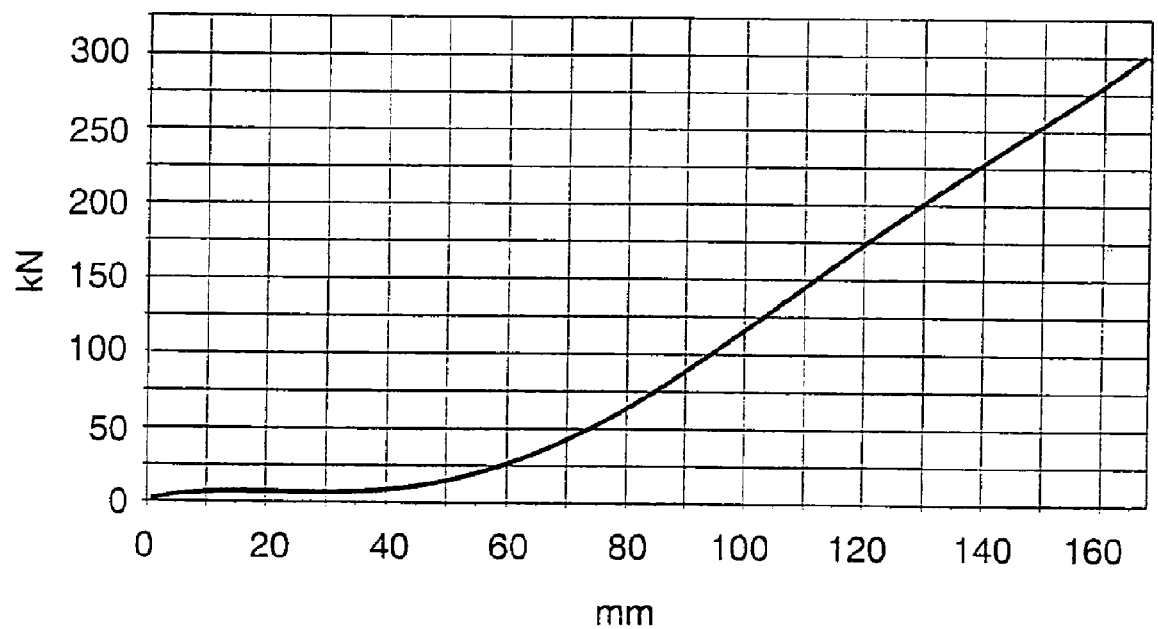

Due to the arrangement described above, overall a characteristic of the force via the deflection, as shown in FIG. 5 as an example, is given for the shock absorber 10. It is characterized by a non-linear profile, which initially begins very flat and transitions into a linear increase with a significantly larger slope after a deflection, which already accounts for a significant percentage of the anticipated maximum deflection. In the shown example, the transition takes place in a region of approximately one third of the maximum deflection. Here, the force in the flat initial section of the characteristic curve is not constant, contrary to the first appearance of FIG. 5, but instead also rises linearly, however, with a significantly smaller slope than in the end section. The flat initial section in FIG. 5 corresponds namely definitively to the section of smaller slope of the characteristic curve of FIG. 4. If the elasticity of the resilient spring body 20 is exhausted with the characteristic curve of FIG. 4 and the force increases further, then the linear characteristic curve of the stiffer spring body 22 begins to dominate the further profile, from which the transition to a linear profile with greater slope is given.

From the embodiment described above, a few possible modifications of the invention emerge for someone skilled in the art. Thus, for example, the overall characteristics of the shock absorber 10 can be varied through suitable selection of resilient and stiff spring bodies 20 or 22 and/or through a change in the number of spring bodies 22 arranged one behind the other in wide limits. Also, if necessary, more than two rows of spring bodies 22 could be arranged one next to the other and/or more than two different types of spring bodies could be arranged one behind the other in the direction of action of the shock absorber 10. Although the previously mentioned rubber-elastic solid material is preferred for the stiffer spring body 22, it would also be conceivable to use other elastic elements, such as, for example, coil springs made from metal for this spring body. Modifications such as these and other comparable modifications lie within the discretion of someone skilled in the art and should be included within the protection of the claims.

The invention claimed is:

1. In a trailing line system in which a plurality of moving carriers, carrying at least one electrical trailing line, are guided in series on a fixed carrier rail and wherein the moving carriers guide said at least one electrical trailing line to a moving work device, and wherein an end clamp device holds the at least one electrical trailing line in a fixed position on the carrier rail relative to the moving carriers, the improvement wherein the end clamp device comprises a housing fixed to the carrier rail, said housing having a bottom wall fixed to the carrier rail, a front wall and a rear wall fixed to the bottom wall, an elongated member slidably mounted in the front wall of the housing with a first portion projecting out of the housing in the direction of moving carrier movement and a second portion located inside the housing, a first shock absorber mounted on the projecting first portion of said elongated member facing in the direction of the moving carriers for initially absorbing an impact of the first moving carrier, a second shock absorber mounted in the housing between the rear wall and the second portion of the said elongated member inside said housing for absorbing any impact passed on by said first absorber, said first and second shock absorbers having different characteristics and being arranged in series one behind the other in the anticipated direction of action of the first shock absorber, the overall characteristics of the shock absorbers being non-linear and having an initial region with a small increase in spring force via a first amount of deflection and a following region with greater increase in spring force via an amount of deflection greater than the first amount of deflection.

2. In a trailing line system according to claim 1 the further improvement of said elongated member being a lifting bar having the first absorber mounted on its end projecting from the housing and a pressure plate mounted on its end in said housing, said pressure plate applying pressure to said second absorber when deflected by the first absorber.

3. In a trailing line system according to claim 2 the further improvement of said second absorber being constituted by a plurality of stiff spring bodies arranged in series between said pressure plate and the rear wall of the housing.

4. In a trailing line system according to claim 3 the further improvement of a guide rod extending between and fixed to the rear and front walls, said pressure plate slidably mounted on said guide rod, and said plurality of stiff spring bodies being mounted on said guide rod between said pressure plate and said rear wall.

5. In a trailing line system according to claim 4 the further improvement of a pair of spaced guide rods extending between and fixed to the rear and front walls, said pressure plate slidably mounted on said guide rods, and said plurality of stiff spring bodies being mounted on both of said guide rods between said pressure plate and said rear wall.

6. In a trailing line system according to claim 1 the further improvement of said first absorber being made from an elastic material with a cellular structure.

7. In a trailing line system according to claim 1 the further improvement of reinforcing elements are fixed between the rear wall and the fixed carrier rail.

* * * * *